United States Patent
Wetzel

[11] Patent Number: 5,620,311
[45] Date of Patent: Apr. 15, 1997

[54] PISTON PUMP HAVING A PUMP CASING TO WHICH A PUMP MOTOR IS ATTACHED

[75] Inventor: Gerhard Wetzel, Korntal-Muenchingen, Germany

[73] Assignee: Robert Bosch GmbH, Stuttgart, Germany

[21] Appl. No.: 575,195

[22] Filed: Dec. 20, 1995

[30] Foreign Application Priority Data

Dec. 20, 1994 [DE] Germany ............... 44 45 362.0

[51] Int. Cl.⁶ ............................................. F04B 17/03
[52] U.S. Cl. ........................................ 417/415; 417/360
[58] Field of Search ........................ 417/415, 273, 417/360, 410.1; 91/491

[56] References Cited

U.S. PATENT DOCUMENTS

| | | | |
|---|---|---|---|
| 3,528,755 | 9/1970 | Valbjorn | 417/312 |
| 5,039,283 | 8/1991 | Mergenthaler et al. | 417/273 |
| 5,105,685 | 4/1992 | Yoshida | 74/606 R |
| 5,326,235 | 7/1994 | Bruhn | 417/410 R |
| 5,383,770 | 1/1995 | Hisahara | 417/273 |

FOREIGN PATENT DOCUMENTS

| | | |
|---|---|---|
| 0509883 | 10/1992 | European Pat. Off. |
| 2301417 | 2/1976 | France. |
| 8301929 | 11/1982 | WIPO. |
| 9427045 | 11/1994 | WIPO. |

*Primary Examiner*—Timothy Thorpe
*Assistant Examiner*—Peter G. Korytnyk
*Attorney, Agent, or Firm*—Edwin E. Greigg; Ronald E. Greigg

[57] ABSTRACT

The invention relates to a piston pump having a pump motor which has a motor shaft which merges into an eccentric for driving at least one pump piston. In order to support the eccentric in a robust manner, the motor shaft has ball bearings on either side of the eccentric, which ball bearings, in order to avoid alignment errors, are inserted into a common eccentric-bearing component. In order to be able to carry out a test run of the pump motor independently of a pump casing, the invention proposes to connect the eccentric-bearing component to a casing of the pump motor.

15 Claims, 2 Drawing Sheets

5,620,311

PISTON PUMP HAVING A PUMP CASING TO WHICH A PUMP MOTOR IS ATTACHED

PRIOR ART

The invention relates to a piston pump as set forth hereinafter.

U.S. Pat. No. 5,105,685, discloses a piston pump having an electric motor as a pump motor which is flanged to a pump casing. A motor shaft is mounted on either side of an armature. It protrudes at a front end from a motor casing and projects with its protruding shaft section into the pump casing, where it continues in an eccentric. In the known piston pump, the eccentric is a journal arranged eccentrically to the shaft and in one piece with the latter. Mounted on it is a connecting rod for driving a pump piston. The eccentric projects freely beyond the shaft bearing arrangement, and it has no counter-bearing for absorbing the forces acting on it when the pump piston is being driven. The motor shaft is thereby subjected to bending stress and consequently can only be loaded to a limited extent.

FR 2 301 417 has disclosed a piston pump in which a motor shaft having an eccentric is mounted at its two ends; the eccentric-side end of the shaft is thus mounted outside the eccentric. In this piston pump, however, no bearing is attached between the eccentric and a motor armature. Consequently the motor shaft is likewise subjected to bending stress when the eccentric is being driven.

WO 83/01929 has disclosed a piston pump which avoids the bending stress of the motor shaft or at least greatly reduces it. In this piston pump, the motor shaft is mounted both at its end remote from the motor and between an eccentric and an armature, that is on either side of the eccentric. In this piston pump, a shaft section between the bearings which has the eccentric is short. However, this piston pump has the disadvantage that the bearing located between the armature and the eccentric sits in a casing cover which is arranged between a motor casing and a pump casing. So that all shaft bearings are in alignment, high production accuracy with close tolerances and if need be adjustment upon assembly is necessary for this piston pump, which makes production more complicated and expensive.

EP 0 509 883 B1 discloses a piston pump which avoids this disadvantage by two motor-shaft bearings directly adjacent to the eccentric being inserted into a common component, namely into a pump casing. However, this construction entails the disadvantage that the motor shaft is mounted in such a way that it is only capable of running when a motor casing is connected to the pump casing. A test run of the motor before the attachment to the pump casing is therefore not possible. A motor defect may therefore only be discovered after the assembly of the piston pump, whereupon the motor has to be dismantled again and repaired or replaced.

ADVANTAGES OF THE INVENTION

Against this background, the piston pump according to the invention has the advantage that its pump motor can be put into operation without it being attached to the pump casing. A test run for checking the proper function of the pump motor can therefore be carried out before the pump motor is attached to the pump casing after its manufacture or any repair. Owing to the fact that the two motor-shaft bearings directly adjacent to the eccentric are accommodated in a common component, a rigid bearing arrangement is obtained, as a result of which vibrations and thus noises are avoided. The eccentric is supported on either side over a short distance so that bending stresses of the motor shaft are kept small. Alignment of the two bearings is ensured by their accommodation in a common eccentric-bearing component.

BRIEF DESCRIPTION OF THE DRAWING

The invention is described in more detail below with reference to exemplary embodiments shown in the drawing, in which.

DETAILED DESCRIPTION OF THE EMBODIMENTS

Figure 1:
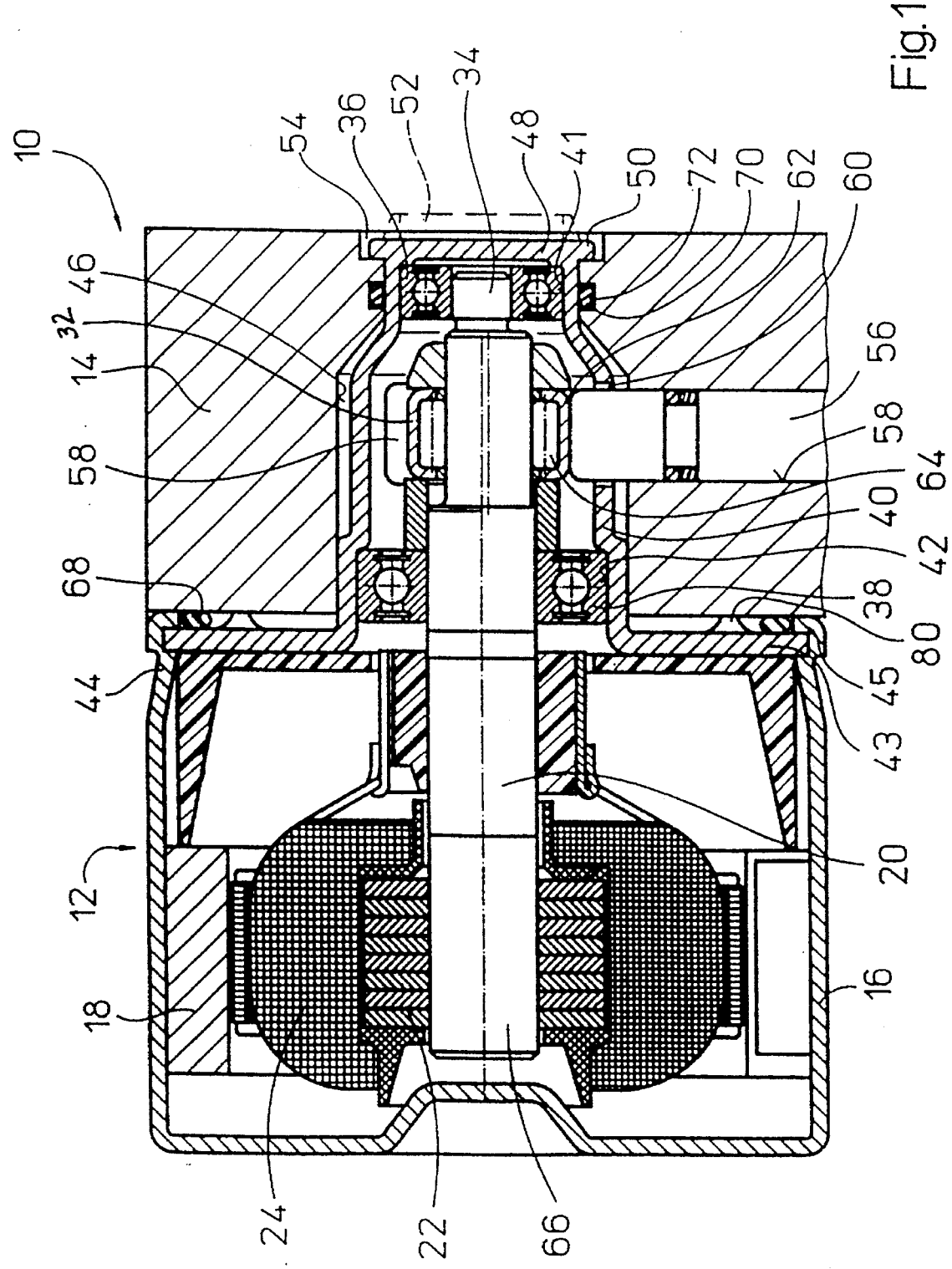
FIG. 1 shows an axial section through a piston pump according to the invention which is angled by 90° on a motor-shaft axis.

The piston pump according to the invention, shown in FIG. 1 and designated overall by 10, has an electric motor 12 as a pump motor which is attached to a pump casing 14. The pump motor 12 has a pot-shaped motor casing 16 which bears with an open front end against the pump casing 14. The pump casing 14 is part of a hydraulic block for an ABS (anti-lock braking system), ASR (anti-slip regulation) or TDR (traction-dynamics regulation) unit. Attached to an inner periphery of the motor casing 16 are permanent magnets 18 which surround an armature which is fastened to a motor shaft 20 in a rotationally locked manner and has a plurality of armature laminations 22 which are wrapped in an armature winding 24.

The motor shaft 20 emerges from the motor casing 16 at the front end facing the pump casing 14 and projects into the pump casing 14. Inside the pump casing 14, the motor shaft 20 merges in one piece into an eccentric journal, the eccentric 32, and ends in one piece with a short, concentric bearing journal 34. The shaft diameter of the motor shaft 20 narrows via the eccentric 32 towards the bearing journal 34.

The motor shaft 20 is mounted by two ball bearings 36, 38 which are attached to the shaft 20 on either side of and adjacent to the eccentric 32. A ball bearing 36 smaller in diameter sits on the short bearing journal 34, and a ball bearing 38 larger in diameter is attached to the motor shaft 20 still within the pump casing 14 between the eccentric 32 and the armature 22, 24.

The two ball bearings 36, 38 are inserted into a sleeve shaped eccentric-bearing component 40. To form two bearing seats 41, 42, the eccentric-bearing component 40 tapers in two steps away from the pump motor 12. In addition, an end 66 of the motor shaft 20 remote from the pump casing 14 can be mounted at the motor casing 16 in embodiments of the invention in a manner known per se.

The eccentric-bearing component 40 has a flange which forms an end wall 43 which closes the open front end of the motor casing 16: the end wall 43 bears against embossments 44 which are impressed repeatedly in a distributed manner over the periphery of the motor casing 16. A free margin 45 at the open front end of the motor casing 16 is beaded. It encloses the end wall 43 and keeps it bearing against the embossments 44, as a result of which the eccentric-bearing component 40 is connected to the motor casing 16. Furthermore, the beaded margin 45 seals off the motor casing and the eccentric-bearing component 40 from one another.

The eccentric-bearing component 40 is inserted into a stepped bore 46, adapted to its external shape, in the pump casing 14. At its side remote from the motor 12, the eccentric-bearing component 40 is closed with an end wall 48 in one piece with it. At this front end, the eccentric-bearing component 40 is provided with a flange 50 which projects radially outwards and holds it in the through bore 46, as a result of which the motor 12 is also fastened to the pump casing 14 via the eccentric-bearing component 40.

The flange 50 is produced by beading an encircling collar 52 (indicated by broken lines in FIG. 1) which projects in the axial direction from the eccentric-bearing component 40 and is in one piece with it. The flange 50 is located in a shallow counterbore 54 at a mouth of the through bore 46.

An undetachable connection is created between the pump motor 12 and the pump casing 14 by forming the encircling collar 52 into a retaining flange 50. This prevents dismantling of the pump motor 12 and thus improper maintenance of the piston pump 10 according to the invention. If the pump casing 14 is part of the hydraulic block of an ABS, dismantling of the pump motor 12 can lead to the total failure of a brake system.

Sealing between the end wall 43 of the pump motor 12 and the pump casing 14 can be effected, for example, by means of a sealing compound 68 which is applied by a dispenser as a "bead" in the shape of a circular ring to the periphery of the end wall 43 before the pump casing 14 is attached to the motor 12. A sealing ring 72 inserted into a groove 70 in the through bore 46 of the pump casing 14 at its side remote from the pump motor 12 seals off the pump casing 14 from the eccentric-bearing component 40. The sealing ring 72 is only required if the side of the pump casing 14 remote from the pump motor 12 is not sealed off in another way, e.g. by a control unit (not shown) attached there.

Spacer lugs 80 on the end wall 43 together with the beaded margin 45 of the motor casing 16 keep the pump motor 12 at a defined distance from the pump casing 14.

In the pump casing 14, two pump pistons 56, of which only one can be seen on account of the sectional representation angled by 90°, are arranged opposite one another in a cylinder bore 58 in a displaceable manner in their longitudinal direction. The pump pistons 56 are disposed radially to the motor shaft 20. Their shaft-side end passes through a peripheral wall of the eccentric-bearing component 40 through one window 58, 60 each. The shaft-side end of the pump pistons 56 abuts against an outer ring 62 of a needle bearing 64 attached to the eccentric 32.

In order to prevent fluid from passing through the windows 58, 60 in the eccentric-bearing component 40 into the interior of the pump motor 12 or into the ball bearings 36, 38, the latter are provided with caps on both sides. The pump pistons 56 are held in contact with the outer ring 62 of the needle bearing 64, for example by means of helical compression springs (not shown). The two pump pistons are driven in a reciprocating motion by rotation of the motor shaft 20.

Figure 4:
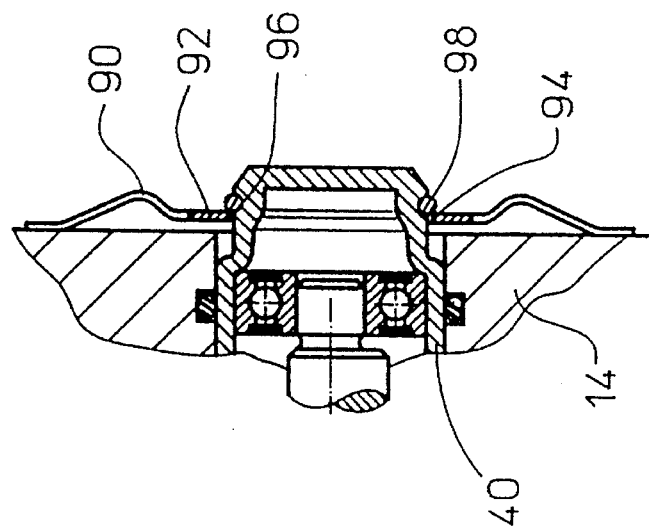
FIGS. 2 to 4 show modified embodiments in the area of a motor-shaft end remote from the motor.
Figure 3:
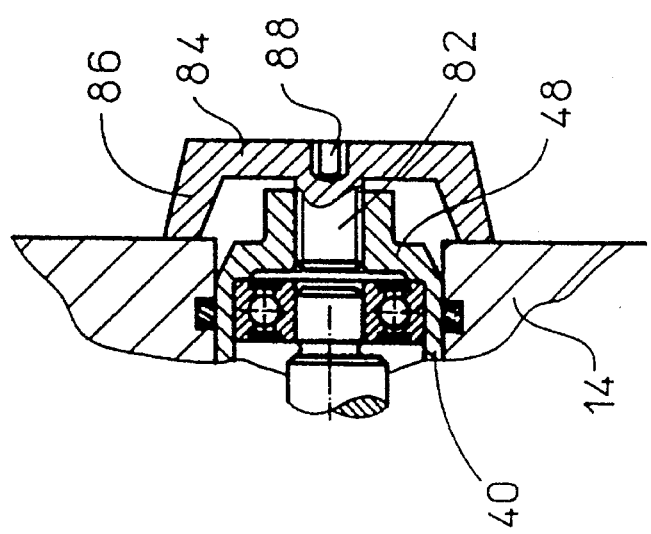
Figure 2:
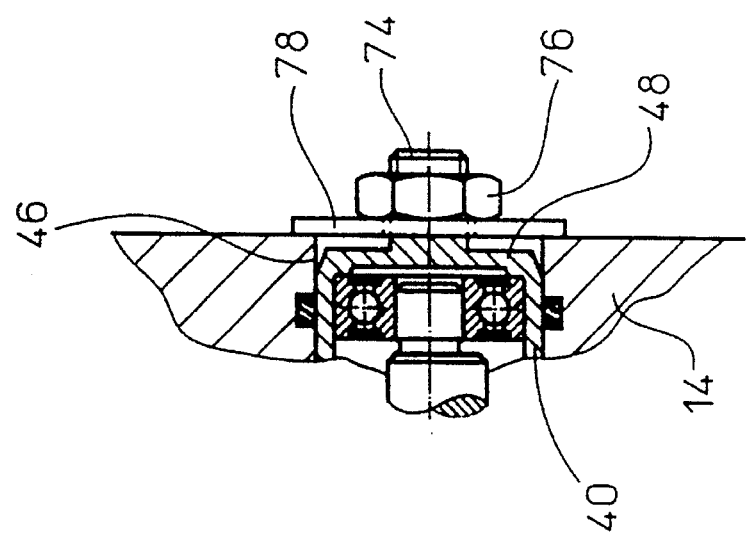

FIGS. 2 to 4 show further means of fastening the pump motor to the pump casing 14. Otherwise the embodiments shown in FIGS. 2 to 4 of piston pumps according to the invention correspond with the embodiment shown in FIG. 1. The same reference numerals are used below for the same components.

In the exemplary embodiment of the invention shown in FIG. 2, the eccentric-bearing component 40 has a threaded journal 74 at its end wall 48 remote from the pump motor. By means of a screwed on nut 76 and a washer 78 which is placed underneath and is supported at its periphery against the pump casing 14, the eccentric-bearing component 40 is drawn into the through bore 46 and the pump motor connected to the eccentric-bearing component 40 is thereby held on the pump casing 14. In this embodiment of the invention, the sleeve-shaped eccentric-bearing component 40 is under axial tension and the pump motor is tensioned against the pump casing 14; in this way generation of noise is avoided.

FIG. 3 shows another means of screwed connection: in this exemplary embodiment the end wall 48 of the eccentric-bearing component 40 remote from the pump motor is provided with an internal thread into which a cover cap 84 having a threaded stem 82 is screwed, which cover cap 84, with a peripheral wall 86 in one piece with it, is supported against the pump casing 14. The cover cap 84 has a hexagon socket 88 for applying a hexagon socket key. This screwed connection also avoids generation of noise by tightening the pump motor against the pump casing 14.

FIG. 4 shows the fastening of the pump motor to the pump casing 14 by means of a spring plate 90. This spring plate 90 is a bent sheet-metal strip which widens out in a disk shave in its center area 92. The disk shaped center area 92 has a hole 94 through which the front end of the eccentric-bearing component 40 remote from the pump motor is inserted. A C-ring 98 inserted into an encircling, flute shaped groove 96 in the eccentric-bearing component 40 holds the spring plate 90 on the eccentric-bearing component 40. The spring plate 90 is supported under pretension against the pump casing 14.

The foregoing relates to preferred exemplary embodiments of the invention, it being understood that other variants and embodiments thereof are possible within the spirit and scope of the invention, the latter being defined by the appended claims.

I claim:

1. A piston pump having a pump casing to which a pump motor is attached, said pump motor has a motor casing and a motor shaft which protrudes in one direction from the motor casing and projects into the pump casing and which has on a shaft section that projects into the pump casing an eccentric for driving at least one pump piston which is arranged to extend radially from the motor shaft and is accommodated in the pump casing in a displaceable manner in a longitudinal direction of the piston, wherein the piston pump (10) has an eccentric-bearing component (40) which projects into a stepped bore (46) in the pump casing (14) and is fastened to the pump casing (14) on a side of the pump casing remote from the pump motor (12) by a flange (50) that projects radially outwards for connecting the pump motor (12) to the pump casing (14) at a side remote from the pump motor (12), said flange (50) is produced by forming a collar (52) that projects in a radial direction from the eccentric-bearing component (40), said eccentric-bearing component (40) surrounds the shaft section of the motor shaft (20) that protrudes from the motor casing (16) and projects into the pump casing (14), said shaft has two shaft bearings (36, 38) inserted into said pump casing on either side of the eccentric (32), the motor shaft (20) is rotatably mounted in said shaft, bearings (36, 38) and has a window (58, 60) through which the at least one pump piston (56) projects at the eccentric (32).

2. The piston pump according to claim 1, wherein the eccentric-bearing component (40) closes the motor casing (16) at one end.

3. The piston Dump according to claim 1, which includes a stepped bore (46) in the pump casing (14), said stepped bore (46) accommodates the eccentric-bearing component (40) and is of a closed design at a side remote from the pump motor (12).

4. A piston pump having a pump casing to which a pump motor is attached, said pump motor has a motor casing and a motor shaft which protrudes in one direction from the motor casing and projects into the pump casing and which has on a shaft section that projects into the pump casing an eccentric for driving at least one pump piston which is arranged to extend radially from the motor shaft and is accommodated in the pump casing in a displaceable manner in a longitudinal direction of the piston, wherein the piston pump (10) has an eccentric-bearing component. (40) which projects into a stepped bore (46) in the pump casing (14) and is fastened to the motor casing (16), the eccentric-bearing component surrounds the shaft section of the motor shaft (20) that protrudes from the motor casing (16) and projects into the pump casing (14), said shaft has two shaft bearings (36, 38) inserted into said pump casing on either side of the eccentric (32) the motor shaft (20) is rotatably mounted in said shaft bearings (36, 38) and has a window (58, 60) through which the at least one pump piston (56) projects at the eccentric (32), the pump motor (12) is held in contact with the pump casing (14) by a spring plate (90) which acts on a side of the eccentric-bearing component (40) remote from the motor casing (16) and is supported against the Dump casing (14).

5. The piston pump according to claim 4, wherein the eccentric-bearing component (40) closes the motor casing (16) at one end.

6. The piston Dump according to claim 4, which includes a stepped bore (46) in the pump casing (14), said stepped bore (46) accommodates the eccentric-bearing component (40) and is of a closed design at a side remote from the pump motor (12).

7. A piston pump having a pump casing to which a pump motor is attached, said pump motor has a motor casing and a motor shaft which protrudes in one direction from the motor casing and projects into the pump casing and which has on a shaft section that projects into the pump casing an eccentric for driving at least one pump piston which is arranged to extend radially from the motor shaft and is accommodated in the pump casing in a displaceable manner in a longitudinal direction of the piston, wherein the piston pump (10) has an eccentric-bearing component (40) which projects into a stepped bore (46) in the pump casing (14) and is fastened to the pump casing (14) on a side of the pump casing remote from the pump motor (12), said stepped bore (46) has oppositely disposed open ends, and in a region of a bore end that is remote from the motor (12), fastening means are provided for firmly holding the eccentric bearing component (40) in the pump housing (14), said eccentric bearing component (40) surrounds the shaft section of the motor shaft (20) that protrudes from the motor casing (16) and projects into the pump casing (14), said shaft has two shaft bearings (36, 38) inserted into said pump casing on either side of the eccentric (32), the motor shaft (20) is rotatably mounted in said shaft bearings (36, 38) and has a window (58, 60) through which the at least one pump piston (56) projects at the eccentric (32).

8. The piston pump according to claim 7, wherein the eccentric-bearing component (40) closes the motor casing (16) at one end.

9. The piston pump according to claim 7, which includes a stepped bore (46) in the pump casing (14), said hollow stepped bore (46) accommodates the eccentric-bearing component (40) and is of a closed design at a side remote from the pump motor (12).

10. A piston pump having a pump casing to which a pump motor is attached, said pump motor has a motor casing and a motor shaft which protrudes in one direction from the motor casing and projects into the pump casing and which has on a shaft section that projects into the pump casing an eccentric for driving at least one pump piston which is arranged to extend radially from the motor shaft and is accommodated in the pump casing in a displaceable manner in a longitudinal direction of the piston, wherein the piston pump (10) has an eccentric-bearing component (40) which projects into a stepped bore (46) in the pump casing (14) and is fastened to the pump casing (14) on a side of the pump casing remote from the pump motor (12), said eccentric-bearing component (40) includes a threaded journal (74) at an end wall remote from the pump motor, said threaded journal passes through a washer which is tightened against an end of said pump casing (14) in order to hold said eccentric-bearing component (40) in place in said pump casing (14), said eccentric-bearing component (40) surrounds the shaft section of the motor shaft (20) protruding from the motor casing (16) and projects into the pump casing (14), said shaft has two shaft bearings (36, 38)inserted into said pump casing on either side of the eccentric (32), with which said shaft bearings (36, 38) the motor shaft (20) is rotatably mounted, and has a window (58, 60) through which the at least one pump piston (56) projects at the eccentric (32).

11. The piston pump according to claim 10, wherein the eccentric-bearing component (40) closes the motor casing (16) at one end.

12. The piston pump according to claim 10, which includes a stepped bore (46) in the pump casing (14), said hollow stepped bore (46) accommodates the eccentric-bearing component (40) and is of a closed design at a side remote from the pump motor (12).

13. A piston pump having a pump casing to which a pump motor is attached, said pump motor has a motor casing and a motor shaft which protrudes in one direction from the motor casing and projects into the pump casing and which has on a shaft section that projects into the pump casing an eccentric for driving at least one pump piston which is arranged to extend radially from the motor shaft and is accommodated in the pump casing in a displaceable manner in a longitudinal direction of the piston, wherein the piston pump (10) has an eccentric-bearing component (40) which projects into a stepped bore (46) in the pump casing (14) and is fastened to the pump casing (14) on a side of the pump casing remote from the pump motor (12), said eccentric-bearing component (40) includes an end wall (48) remote from the pump motor that is provided with an internal thread into which a threaded stem (82) of a cover cap (84) is screwed, said cover cap (84) includes a peripheral wall (86) which is supported against said pump casing (14), said eccentric-bearing component (40) is connected to the motor casing (16), surrounds the shaft section of the motor shaft (20) protruding from the motor casing (16) and projects into the pump casing (14), said shaft has two shaft bearings (36, 38) inserted into said pump casing on either side of the eccentric (32), with which said shaft bearings (36, 38) the motor shaft (20) is rotatably mounted, and has a window (58, 60) through which the at least one pump piston (56) projects at the eccentric (32).

14. The piston pump according to claim 13, wherein the eccentric-bearing component (40) closes the motor casing (16) at one end.

15. The piston pump according to claim 13, which includes a stepped bore (46) in the pump casing (14), said hollow stepped bore (46) accommodates the eccentric-bearing component (40) and is of a closed design at a side remote from the pump motor (12).

* * * * *